United States Patent [19]

Imaide et al.

[11] Patent Number: 4,556,911
[45] Date of Patent: Dec. 3, 1985

[54] METHOD AND APPARATUS FOR DRIVING A SOLID STATE CAMERA

[75] Inventors: Takuya Imaide; Michio Masuda; Akihide Okuda; Ryuji Nishimura, all of Yokohama, Japan

[73] Assignee: Hitachi, Ltd., Tokyo, Japan

[21] Appl. No.: 592,955

[22] Filed: Mar. 23, 1984

[30] Foreign Application Priority Data

Mar. 23, 1983 [JP] Japan .................................. 58-47124

[51] Int. Cl.$^4$ ............................................. H04N 3/12
[52] U.S. Cl. .................................................... 358/212
[58] Field of Search ................................ 358/212, 213

[56] References Cited

U.S. PATENT DOCUMENTS 4,233,632 11/1980 Akiyama ............................. 358/212
4,462,047 7/1984 Fujimoto ............................. 358/212

Primary Examiner—Gene Z. Rubinson
Assistant Examiner—L. C. Schroeder
Attorney, Agent, or Firm—Antonelli, Terry & Wands

[57] ABSTRACT

A method and apparatus for increasing the sensitivity of a charge priming type solid state camera having means for sweeping out undesired excess charges generated by a vertical smear from vertical signal lines. When the scene illumination is higher than an appropriate value, the sweep out of the undesired excess charges is executed within each horizontal blanking period in order to reduce the vertical smear. When the scene illumination becomes lower than the appropriate value, the sweep out thereof is stopped in order to increase the sensitivity. Alternatively, when the scene illumination is lower than the appropriate value but the quantity of the vertical smear is larger than a fixed value, the sweep out thereof is executed within each horizontal blanking period in order to suppress vertical smear which is at an unacceptably high level even though the illumination level is relatively low.

13 Claims, 24 Drawing Figures

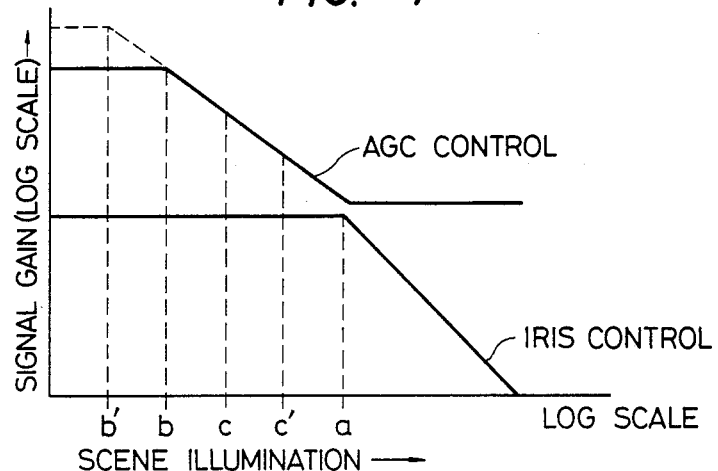
FIG. 7
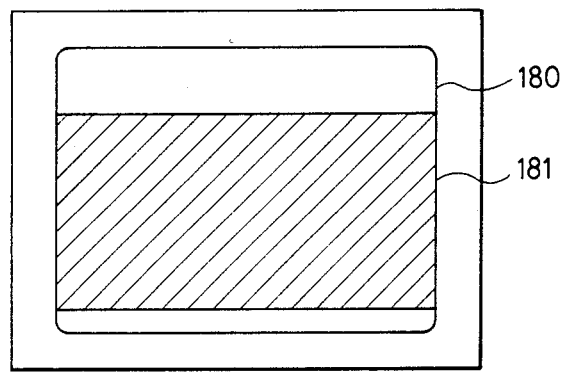
FIG. 8
FIG. 9A
| W | G |
|---|---|
| $C_y$ | $Y_e$ |
FIG. 9B
| W | G |
|---|---|
| $C_y$ | $Y_e$ |

METHOD AND APPARATUS FOR DRIVING A SOLID STATE CAMERA

BACKGROUND OF THE INVENTION

This invention relates to a method and apparatus for driving a solid state camera, especially a method for driving a solid state camera having high sensitivity.

A solid state camera using a single-chip solid state image sensor has many advantages over a conventional tube type camera, such as small scale, light weight, low power consumption, no sticking, no image lag, long life and stability. On the other hand, the solid state camera has some inherent problems, such as vertical smear, fixed pattern noise (hereinafter FPN) and blooming. Especially, the vertical smear is a serious problem, which is not generated in the conventional tube type camera.

There are three types of the solid state camera in the market, that is, the Metal Oxide Semiconductor type, the Charge Priming Device type and the Charge Coupled Device type (hereinafter MOS type, CPD type and CCD type, respectively). The CPD type solid state camera is able to sweep out vertical smear charges from vertical signal lines to the outside prior to reading out signal charges from photodiodes to the vertical signal lines, so that it can easily suppress the vertical smear.

Hereinafter, examples of this CPD type solid state camera are explained using the FIGS. 1, 2 and 3. FIG. 1 shows an example of the CPD type solid state camera having a circuit for sweeping out the vertical smear charges. The numerals 1, 2 and 3 denote a photodiode, a MOS transistor used as a vertical switch, and a vertical signal line, respectively. The numeral 9 designates a charge transfer device (hereinafter CTD, for example, a buried channel type CCD), which can transfer the signal charges of the photodiodes belonging to two adjacent horizontal rows during a horizonal scanning period. A combination part constructed by MOS transistors 4 to 8 combines the vertical signal line 3 and the CTD 9. The MOS transistor 5 is preferably a depletion type used as a capacitance. The numeral 10 denotes a vertical scanning circuit, each output of which is connected to each vertical gate line 11.

In the first increment of the horizontal blanking period, excess charges, which are generated by vertical smear, blooming, etc. are swept out from the vertical signal lines 3 through the transistors 4, 5, 6 and 7 to a blooming sweep out drain (hereinafter BD). After that, the signal charges of the photodiodes 1 belonging to the designated horizontal line are read into the vertical signal lines 3 and are transferred to the CTD 9 through the transistors 4, 5, 6 and 8. Usually, this execution is repeated twice so that the signal charges of two adjacent horizontal lines are transferred to the CTD9. During the following horizontal period, the CTD9 is scanned to supply the signal charges to an output terminal. The method of simultaneously reading out the video signal of the two adjacent horizontal lines is not directly related to this invention, but it is effective to get a single-chip solid state color camera having high picture quality.

FIGS. 2A and 2B show an equivalent circuit and driving pulses of the CPD type solid state camera shown in FIG. 1, respectively. The equivalent circuit shown in FIG. 2A is related to a signal charge transferring path from one of the photodiodes 1 to the CTD9. Cpd, Cv and C4 indicate capacitances of the photodiode 1, the vertical signal line 3 and the gate of the transistor 5, respectively. T1, T2, T3 and T4 indicate driving pulses for the gates of the MOS transistors 8, 6, 4 and 5, respectively. H1 indicates one of clock pulses for driving the CTD9. Referring to FIG. 2B, time periods t1–t9 construct one horizontal blanking period. During the time period t1, inner bias charges are poured into the capacitance Cv from the capacitance C4, and the excess charges accumulated in the capacitance Cv are efficiently transferred to the capacitance C4 together with the inner bias charges. During the time period t2, outer bias charges are injected into the capacitance C4 from the BD in the form of the constant voltage. Concurrently with the injection, the excess charges are swept out from the capacitance C4 to the BD. After that, the outer bias charges are swept out to the BD. As the transistor 4 is in the OFF state during the time period t2 (see the driving pulse T3 shown in FIG. 2B), the signal charges in the capacitance Cpd can be read out to the capacitance Cv by making the pulse VG corresponding to the designated horizontal line into the ON state. During the time period t3, the inner bias charges are poured again from the capacitance C4 into the capacitance Cv, and the signal charges in the capacitance Cv are efficiently transferred to the capacitance C4 together with the inner bias charges. During the time period t4, other outer bias charges (hereinafter CTD bias charges) are injected from the CTD 9 to the capacitance C4, and the signal charges are efficiently read out from the capacitance C4 into the CTD 9 together with the CTD bias charges. During the time period t5, all the signal charges in the CTD 9 are shifted by one stage. During the time periods t6–t9, the same process as mentioned above is executed except that the adjacent horizontal line is designated. For example, if the pulse VG depicted as a continuous line corresponds to the pulse VGn+2 shown in FIG. 1, the pulse VG drawn by a dotted line corresponds to the pulse VGn+1 shown in FIG. 1.

The reason for using the bias charges in the process of transferring charges from the capacitance Cv to the capacitance C4, and from the capacitance C4 to CTD 9 is to improve a transfer efficiency. Generally, in a case where small signal charges are transferred from a capacitance C through a MOS transistor in a saturated region having a channel conductance $\beta$ with bias charges B during a transfer period $\tau$, a transfer inefficiency $\epsilon$ is shown by the following formula:

$$\epsilon = \left(1 + \frac{\beta B}{2C^2} \cdot \tau \right)^{-2} \tag{1}$$

Accordingly, using the bias charges is a usual practice in order to improve the transfer efficiency.

Now, the formula (1) shows that the transfer efficiency is sensitive to the capacitance C. The capacitance Cv is several pF and extremely larger than other capacitances (Cpd$\approx$0.05 pF, C4$\approx$0.1 pF). Therefore, in order to efficiently transfer the charges from the capacitance Cv, it is necessary to enlarge the bias charges B because it is difficult, as a practical matter, to enlarge the transfer period $\tau$ and the channel conductance $\beta$. So, the conventional method using the inner bias charges is very useful. In this method, to enlarge the bias charges B infinitely does not result in reduction of the dynamic range, because the inner bias charges come and go only between the capacitance Cv and the capacitance C4. Further, if the driving pulses T2, T3 and T4 balance between the sweep out period and the read out period, the FPN does not generate in the charge transferring process from the capacitance Cv to the capacitance C4.

Next, the suppression effect of the vertical smear will be explained. There are two types of the vertical smear, which are not swept out and are read out. One type of the vertical smear is due to bad transfer efficiency in the sweep out period. Another type of the vertical smear is generated by the mixture of the charges in the vertical signal line 3 during the period from the end of sweeping out the excess charges from the capacitance Cv to the end of reading out the signal charges from the capacitance Cv. If the radio of the period (t2+t3+t7+t8), which corresponds to a non-sweep out period, to the horizontal period (about 64 $\mu$S) is $\alpha$, and the transfer inefficiency $\epsilon$ from the capacitance Cv to the capacitance C4 is $\epsilon$v, a reducing rate R of the vertical smear by means of the sweep out is shown as the following formula:

$$R = \epsilon v(1-\alpha) + \alpha \qquad (2)$$

It is apparent from the formula (2) that the vertical smear can be endlessly suppressed by raising up the transfer efficiency and shortening the transfer period $\tau$. However, as the formula (1) shows, raising up the transfer efficiency conflicts with shortening the transfer period $\tau$. So, in the CPD type solid state camera shown in FIG. 1, a desirable reducing rate R of about 0.1 ($-20$ dB) is not feasible.

FIG. 3 shows another example of the CPD type solid state camera which is improved at this point. The difference between the example shown in FIG. 3 and the one shown in FIG. 1 is that the former circuit has an inverter 22 constructed by an enhancement type MOS transistor 20 and a depletion type MOS transistor 21, an input of which is connected to the vertical signal line 3 and an output of which is connected to the gate of the MOS transistor 4. The timing of the driving pulses is the same as the one shown in FIG. 2B except that the driving pulse T3 is supplied to a terminal VD, and a terminal VS is connected to the ground. The effect of adding the inverter 22 having a gain ($-G$) is to equivalently make the capacitance of the vertical signal line 3 Cv/(1+G). Apparently from the formula (1), the inverter 22 immensely contributes to the improvement of the transfer efficiency so that the reducing rate R shown in the formula (2) can readily be made lower than 0.1 ($-20$ dB).

Now, as mentioned above, the CPD type solid state camera can be expected to be superior in picture quality and sensitivity to the MOS type solid state camera. On the other hand, the CCD type solid state camera has some problems, i.e., image lag, vertical smear and a roughness of a color filter arrangement in the vertical direction so that it is inferior in picture quality to the CPD type and the MOS type. However, it is superior in sensitivity when compared to the other types. In the CCD type, the factor of reducing sensitivity is random noise generated in a horizonal transferring CCD, which corresponds to the CTD9 shown in FIGS. 1 and 3. On the other hand, in the CPD type, there are other factors of suppressing sensitivity, i.e., random noise, FPN and shading generated in the combination part (i.e., the transistors 4 to 8 which combine the vertical signal line 3 to the CTD9). However, in the CPD type, an aperture ratio of the photodiode is about two times as large as one of the CCD type so that the CPD type is superior in all aspects to the CCD type, if total noise of the CPD type is reduced lower than half of one of the CCD type.

So, hereinafter, the random noise, the FPN and the shading generated in the combination part will be explained. The random noise is mainly generated in the charge transfer process from the capacitance Cv to the capacitance C4. FIG. 4 illustrates randon charge fluctuations q1,q2,—on the capacitance Cv in the same time scale as one shown in FIG. 2B. When the transistor 4 is in the OFF state, that is, the time periods t2, t4, t5, t7 and t9, the charges on the capacitance Cv do not vary. Further, if the transfer efficiency from the capacitance Cv to the capacitance C4 is sufficiently high, the charge fluctuations q1, q2—have no correlation, mutually. The main cause of the charge fluctuations q1,q2,—of the camera shown in FIG. 3 differs from one of the camera shown in FIG. 1. In the latter, they come from thermal noise generated in the channel of the MOS transistor 4, and in the former, they are caused by random noise generated in the inverter 22 and the variation of the gate voltage of the MOS transistor 4 with random noise. In both of them, the charge fluctuations can be illustrated by FIG. 4. During the time period t3, noise charges (q3−q2) are read out and during the time period t8, noise charges (q5−q4) are read out. Assuming that a root means square value (hereinafter rms value) of the charge fluctuations q1,q2—is qn, the rms value of random noise charges per one picture element becomes $\sqrt{2}$ qn. The random noise generated in the charge transfer process from the capacitance C4 to the CTD9 or the BD can be neglected, because the capacitance C4 is extremely smaller than the capacitance Cv.

On the contrary, the FPN is generated in the charge transfer process from the capacitance C4 to the CTD 9 or the BD. There are two kinds of the FPN in the charge transfer process from the capacitance C4, one of which comes from a dispersion $\Delta B$ of the bias charges. The CTD bias charges, which are injected into the CTD 9, for example, by the potential balance method, do not have the dispersion theoretically, but in fact have the dispersion caused by the dispersion in shapes of the transfer gates of the CTD 9. If all the CTD bias charges can be injected into the combination part, the injection dispersion does not occur. However, the charges do not flow easily in the direction to the combination part. So, as all the CTD bias charges can not be injected to the combination part, the injection dispersion $\Delta B$ exist. As a result, the FPN comes from a leftover part of the injection dispersion $\Delta B$. With the same manner described above, the injection dispersion of the outer bias charges generates the FPN.

Another kind of the FPN is caused by a structure of the gate of the MOS transistor 6. FIG. 5 illustrates a plane figure of the gates of the MOS transistors 5 to 8. Apparently from FIG. 5, the gate of MOS transistor 6 has a narrow part, which can control a current flow by itself. However, there is a difference of the current flows between the side of the CTD 9 and the side of the BD, so that effective threshold voltages are different. The difference $\Delta Vt$ of the threshold voltages disperses in response to the dispersion of the parameters of the MOS transistor 6. If this dispersion is $\Delta \Delta Vt$ and the dispersion of the capacitance C4 is $\Delta C4$, the charges ($\Delta C4.\Delta Vt + C4.\Delta \Delta Vt$) of the FPN generate per one picture element.

The shading comes from a long time constant of the vertical gate line 11. As the vertical gate line 11 is made of poli-silicon, it has the time constant, approximately equal to 1 us. Therefore, even if the pulse VG has an ideal wave form shown in FIG. 2B at the left end of the vertical gate line 11, the pulse VG becomes to have a dull wave form at the right end thereof. So, the response does not completely cease at the next read out period t3. The vertical gate line 11 crosses over the vertical signal line 3 and there is a large capacitive coupling so that the shading in the horizontal direction generates.

SUMMARY OF THE INVENTION

Accordingly, it is an object of the present invention to provide a method for driving a CPD type solid state camera in order to obtain high sensitivity and an apparatus thereof.

It is another object of the present invention to provide a method for removing some factors which reduce sensitivity of a CPD type solid state camera having means for sweeping out undesired excess charges from vertical signal lines and apparatus thereof.

Briefly, to attain the above mentioned objects, according to the present invention, in the CPD type solid state camera having means for sweeping out undesired excess charges from vertical signal lines, the sweep out is controlled in response to a scene illumination or the quantity of the vertical smear charges. Namely, the sweep out of undesired excess charges is not executed when the condition exists that the scene illumination is lower than a predetermined level. Further, the sweep out of the excess charges is not executed when the condition exists that the scene illumination and the quantity of the vertical smear charges are lower than predetermined levels, respectively. According to applicants' experiments, stopping the sweep out of the undesired excess changes in this manner causes a large suppression of the factors which reduce the sensitivity.

Random noise can be reduced more than 3 dB, and, if the frequency characteristic of eyes is taken into consideration, it can be reduced even further. This will be explained by using FIG. 4. When the MOS transistor 7 is always in an OFF state and the charges are not swept out, the random noise charges read out into the CTD 9 during the time period t4 become $(q3-q1)$, and ones during the time period t9 are $(q5-q1)$. Here, it is important that both of them have a negative correlation because two picture elements, from which signal charges are read out during the time periods t4 and t9, are located in the same horizontal position, and a final luminance signal is produced by adding the signal charges thereof. Accordingly, the random noise charges become $(q5-q1)$, the rms value thereof becomes $\sqrt{2}\,qn$, and the rms value per one picture element becomes $qn$. As a result, the random noise is reduced by 3 dB in comparison with the case of executing the sweep out. Further, if the sweep out is not executed, the random noise changes have another negative correlation in the vertical direction. If the random noise charges within the luminance signal read out after one horizontal scanning period is $(q5'-q1')$, an equality $q5=q1'$ comes into existence. In this case, spectra of the random noise in the vertical direction come to have triangular forms so that the random noise becomes less conspicuous.

For representing the aformentioned matter by a formula, it is assumed that a power spectral density S of the random noise within the luminance signal in the case of executing the sweep out equals to 1. So, a power spectral density S' thereof in the case of stopping the sweep out is shown as the following formula:

$$S' = \sin^2 \pi f / fh \qquad (3)$$

Here, fh equals to $1/H \simeq 15$ kHz. FIG. 6 shows the power spectral densities S and S'. Referring to FIG. 6, N indicates integral numbers. A difference between the density S and the density S' is 3 dB in power, that is, 3 dB in a measured value. However, apparently from FIG. 6, the peaks of the density S' are located in the frequencies $(N+\frac{1}{2})fh$ which correspond to 250 TV lines in the vertical direction. On the other hand, the bottoms of the density S' are located in the frequencies Nfh which correspond to 0 TV lines in the vertical lines. So, the difference between the density S and the density S' becomes more than 3 dB by using a low pass type correction. That is, by using a comb filter, the difference thereof becomes clear. If the comb filter having a feedback ratio $k \, (=0.5)$ is inserted, the difference becomes just 6 dB. The comb filter will be explained later. FIG. 6 shows the characteristics in the case using the comb filter having a feedback ratio $k \, (=0.5)$.

The above-mentioned explanation is based on the fact that the picture elements, that is, the photodiodes are arranged in a square disposition, but in the case where the picture elements are shifted a half picture element pitch on every horizontal line, almost the same effect will be obtained.

The FPN and the shading does not quite occur in the case of stopping the sweep out. The FPN, due to the structure of the gate of the MOS transistor 6 becomes zero, because the charges pass only through the gate of the MOS transistor 8. The FPN due to the injection dispersion $\Delta B$ of the bias charges does not occur, because the leftover part thereof can. not go everywhere and comes back to the CTD 9. Further, concerning the shading, charges other than the random noise charges on a vertical signal line just after the time period t3, in which period the first read-out from the capacitance Cv is executed, have the same quantity as ones just after the time period t8, in which period the second read-out from the capacitance Cv is executed, so that the shading does not occur in the combination part.

Sumarizing the above mentioned explanation, it is possible to eliminate the FPN and the shading and to suppress the random noise more than 3 dB by stopping the sweep out. However, to always stop the sweep out causes the problem of the vertical smear and results in poor picture quality again. So, according to this invention, the sweep out is automatically or manually stopped on condition that improving the sensitivity has priority to suppressing the vertical smear. In the case of an ordinary video camera, there are two situations where improving the sensitivity thereof has priority. That is, (1) where the average light level of a scene is dark, and (2) where a contrast ratio of the scene is small so that the S/N ratio of the vertical smear is high. Therefore, it is considered that the sweep out is stopped in the case (1) or in the case (1) and (2). Generally, from a point of view of improving the sensitivity, it is better to stop the sweep out in the case where the average light level of a scene becomes dark, that is, the scene illumination goes down. However, in some cases when the scene is generally dark but receives light from a candle or a fluorescent lamp, the vertical smear becomes extreme and as a result the picture quality becomes poor. In order to cope with this problem, it becomes necessary, too, to consider the quantity of the vertical smear in addition to the scene illumination.

FIG. 7 shows general curves of the signal gain of a standard video camera. The abscissa represents the scene illumination, which is usually detected from an average signal, that is, a mean value of the luminance signal, in a central part of a screen. If the scene illumination is higher than a standard scene illumination a, for example, when the S/N of the luminance signal is higher than 46 dB, an output signal level is made constant by stopping down an iris. On the other hand, when the scene illumination is lower than the standard scene illumination a, to prevent the output signal level from becoming considerably reduced, the iris is fully open and an AGC is worked from the standard scene illumination a to a lowest scene illumination b, for example, in which the S/N of the luminance signal becomes 35 dB. In the case that the scene illumination is lower than the lowest scene illumination b, the AGC is made into the maximum gain so that the noise does not increase. The aforementioned method of this invention for improving the sensitivity is applied to the video camera having the curve of the signal gain as shown in FIG. 7. First, scene illuminations C and C' are determined on the following condition, that is, $a \geq C' > C \geq b$. Then, if the scene illumination is lower than C, the sweep out is stopped. Next, when the scene illumination is more than C', the sweep out is executed. If there is no hysteresis on the control for executing and stopping the sweep out, the motion near by an exchanging point becomes unstable. Further, it is apparent that the gain of the AGC can be raised until a lowest scene illumination b' in the case of stopping the sweep out as shown with a dotted line in FIG. 7.

FIG. 8 illustrates a TV monitor having a screen 180 which can be coupled to the video camera of the present invention to illustrate the scene illumination. On this screen 180 a part 181 in which the scene illumination is detected is shown with oblique lines. As shown in FIG. 8, pictures in the upper and lower parts are usually ignored. Specially, there are many cases in which the sky exists in the upper part of the screen and the sky is usually brighter than other objects. So, if the scene illumination is detected by containing the signal of the sky in order to control the iris and the AGC, pictures of the objects become darker. Accordingly, it is better to widely ignore the upper part of the screen. Further, in the method for detecting the scene illumination, there are more cases in which not only the mean value of the luminance signal in the central part is used, but also the peak value thereof is detected together with the former. They will be explained in more detail later.

Now, as mentioned above, there are some cases where it is necessary to suppress the vertical smear, even if the scene is dark. In particular, as shown in FIG. 8, the iris and the AGC are ordinarily controlled by only the video signals in the central part. So, if there is a fluorescent lamp in the upper part of the screen, the vertical smear becomes remarkable. Therefore, it becomes necessary to execute the sweep out in the dark scene by detecting the quantity of the vertical smear directly or indirectly. It is possible to detect the quantity of the vertical smear directly by using the output signal from the sensor 52 during the vertical blanking period. The output signal during the vertical blanking period is equivalent to the vertical smear charges, so that it is possible to obtain information concerning the vertical smear by passing the output signal through an appropriate low pass filter and peak-detecting it. If a more accurate value of the vertical smear charges is needed, it is better to shut off the MOS transistor 8 during several horizontal periods, to accumulate the information concerning to the vertical smear on the vertical signal line 3 or the combination part during those periods and to read out the accumulated signals. Further, there are some methods to detect the quantity of the vertical smear indirectly. One is to detect a contrast ratio of the whole screen. Another is to detect a white area having a higher level than an appropriate level. In the cases of controlling the sweep out by using the vertical smear, needless to say, hysteresis on the control is necessary, too.

Last, an arrangement of color filters on the photodiode array suitable for this invention will be explained. In the above explanation, the random noise for the luminance signal is considered. But, it is necessary to take random noise for a color signal into consideration, too.

Generally, sensitivity for blue is not good in the solid state image sensor, so that it is necessary to pay attention to noise of the blue signal. The arrangement of the complementary color filters has four color elements, that is, white (W), yellow (Ye), cyanic (Cy) and green (G). The luminance signal Y and a blue signal B are obtained by the following formulas, respectively:

$$Y = W + Ye + Cy + G$$

$$B = W - Ye + Cy - G$$

On the other hand, the reduction of the random noise within the luminance signal in the case of stopping the sweep out is due to the addition of the random noises having the negative correlation. Therefore, in general, color signals do not have this effect. However, in the arrangements of the color filters shown in FIGS. 9A and 9B, charges under the filters W and Cy, and charges under the filters G and Ye are read out through the same vertical signal lines, respectively, so that noises within the signal charges W and Cy, and G and Ye have negative correlations. Therefore, the blue signal B can have the effect of reducing the random noise by stopping the sweep out like the luminance signal.

BRIEF DESCRIPTION OF THE DRAWINGS

FIG. 7 represents a characteristic of a signal gain of a CPD type solid state camera in response to a scene illumination, FIG. 8 illustrates a screen of a TV monitor, FIGS. 9A and 9B illustrate arrangements of complementary color filters, respectively.

DETAILED DESCRIPTION OF THE PREFERRED EMBODIMENTS

Figure 1:
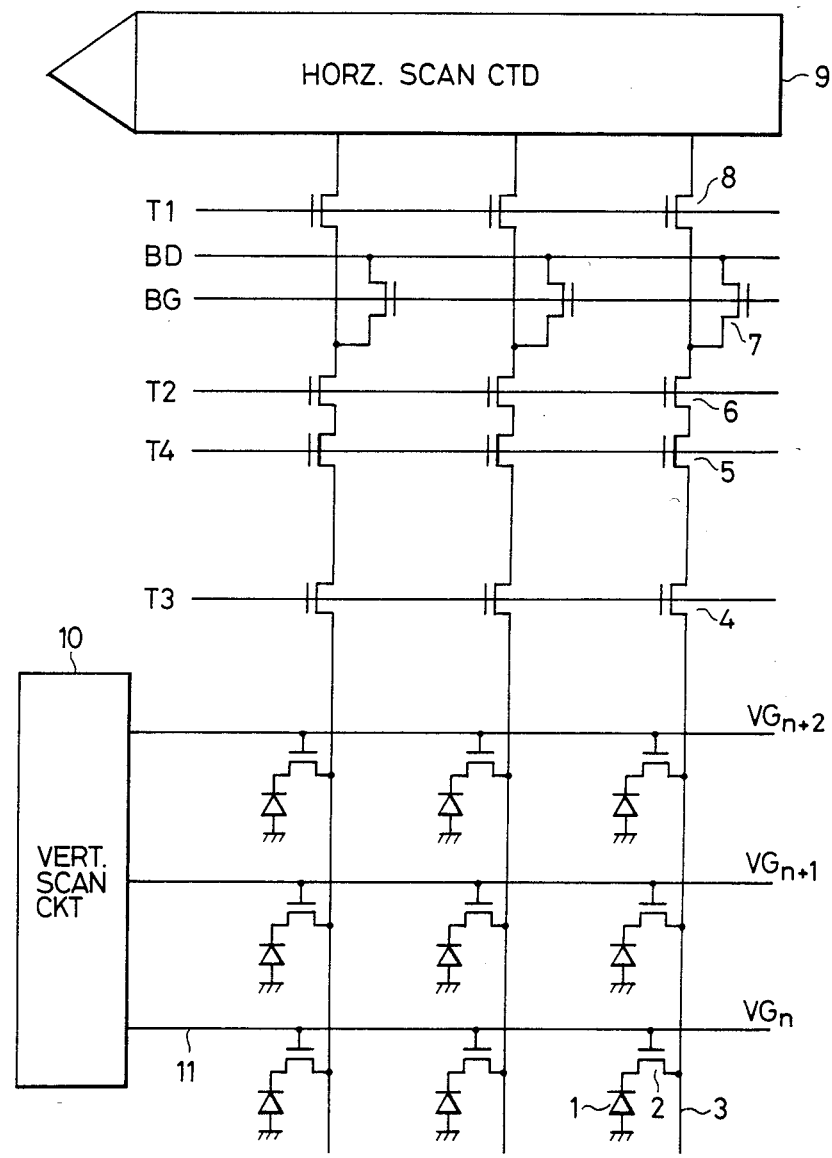
FIG. 1 is a circuit diagram of a prior art CPD type solid state image sensor.
Figure 2A:
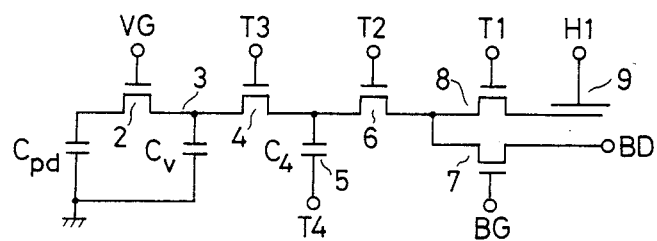
FIG. 2A represents, an equivalent circuit diagram of the circuit shown in FIG. 1.
Figure 2B:
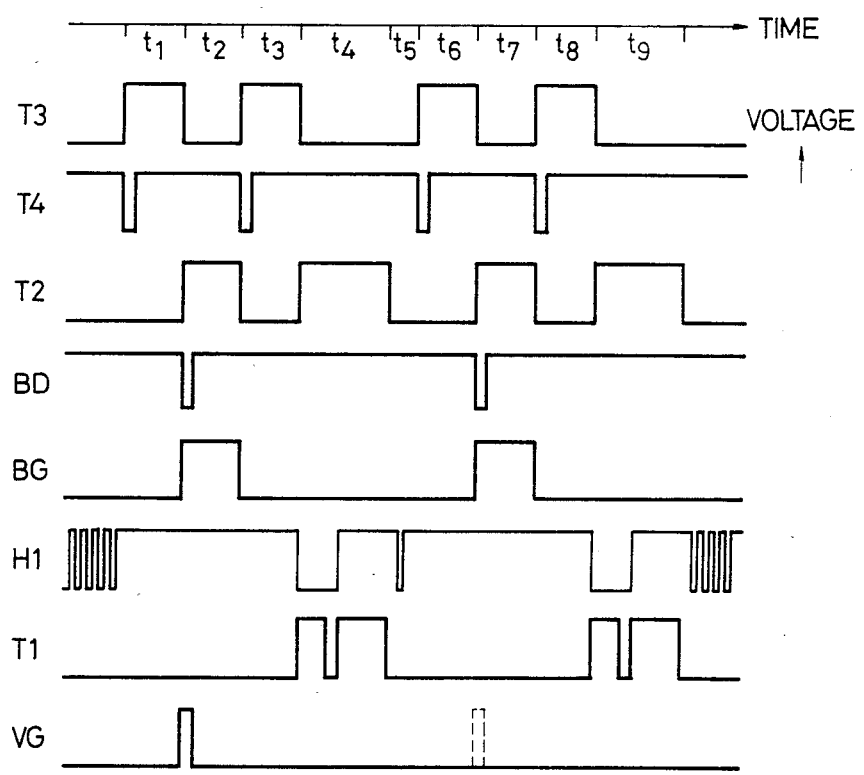
FIG. 2B illustrates waveforms of driving pulses for the circuit shown in FIG. 1.
Figure 3:
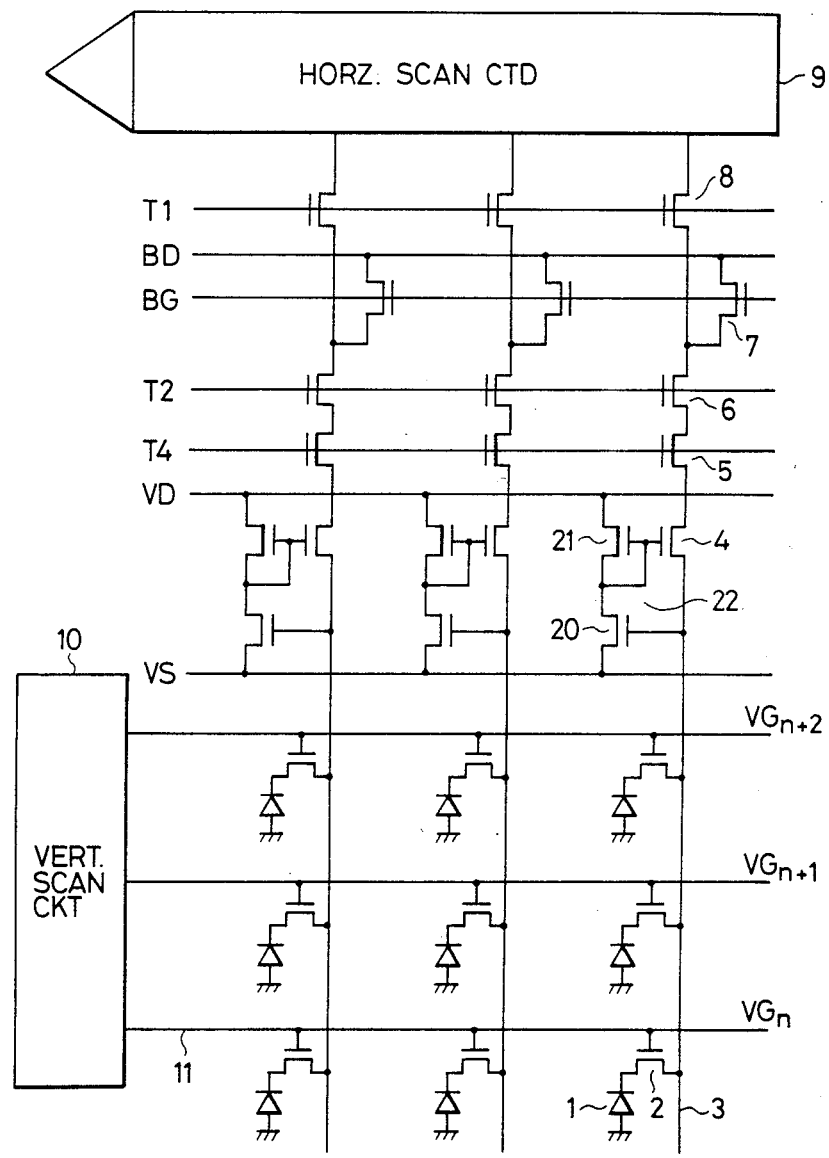
FIG. 3 is a circuit diagram of another prior art CPD type solid state image sensor.
Figure 4:
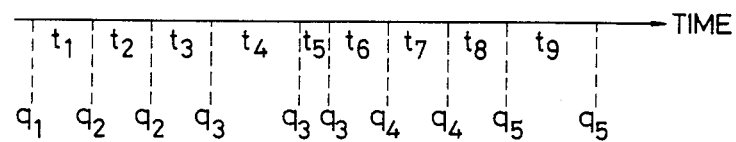
FIG. 4 illustrates a timing chart for showing random noises on a capacitance Cv of a vertical signal line.
Figure 5:
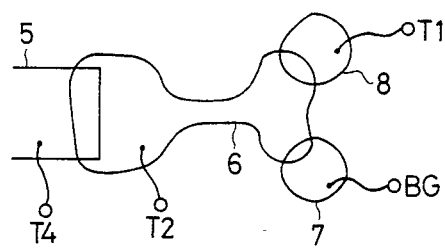
FIG. 5 illustrates a plane structure of gates of the MOS transistors 5,6,7 and 8 shown in FIGS. 1 and 3.
Figure 6:
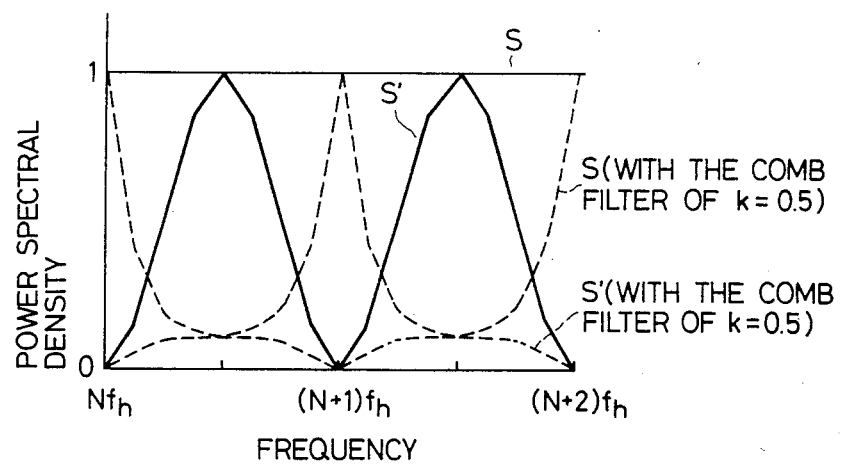
FIG. 6 represents a characteristic of a power spectral density of the random noises.
Figure 10:
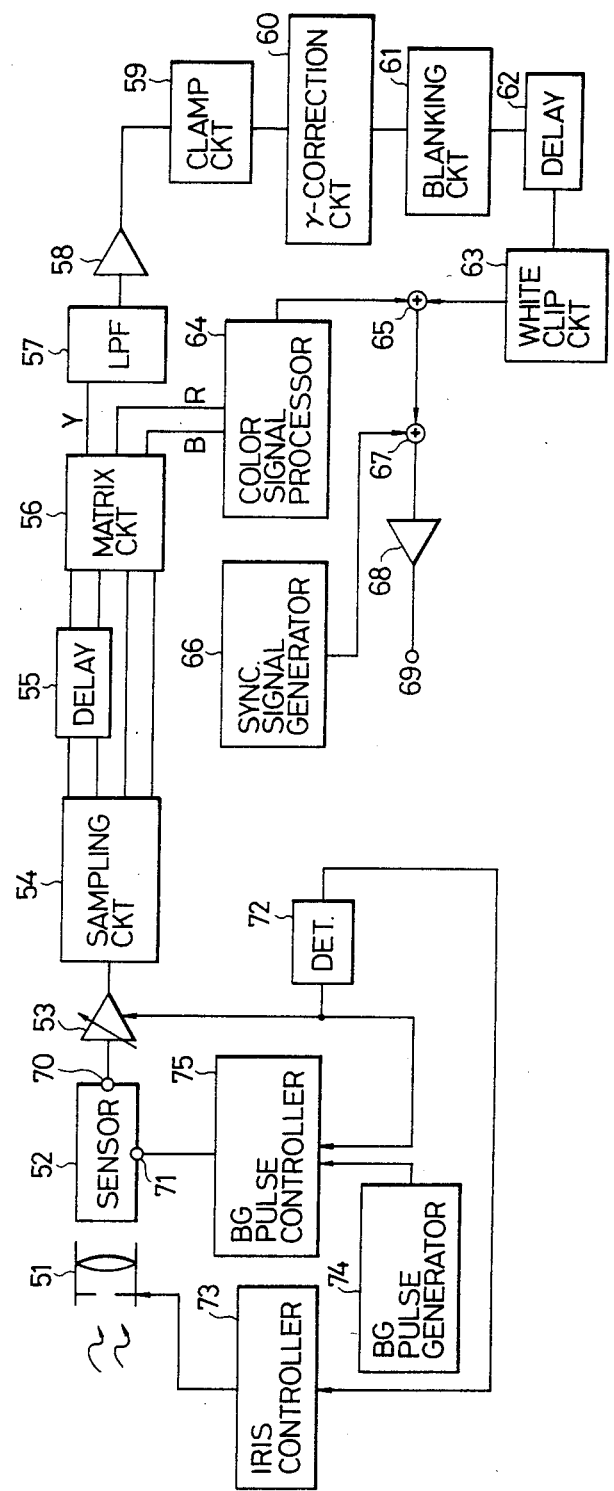
FIG. 10 is a block diagram representation of a CPD type solid state camera according to an embodiment of this invention.

Hereinafter, some embodiments of the present invention will be explained by using FIGS. 10 to 22. Referring to FIG. 10, the numeral 52 denotes a CPD type solid state image sensor shown in FIGS. 1 or 3, which is generally formed on one chip. The numerals 70 and 71 designate an output terminal of the CTD 9 and an input terminal of the BG pulses, respectively. An arrangement of color filters on the image sensor 52 such as that shown in FIG. 9A is provided. The numerals 51, 53 and 54 denote a barrel having a lens and an iris, an AGC amplifier and a sampling circuit, respectively. The sampling circuit 54 separates the signal charges W, Ye, Cy and G. The numeral 55 denotes a delay circuit for adjusting phases of the signal charges W, Ye, Cy and G based on the arrangement of the color filters. A matrix circuit 56 produces a luminance signal Y, a red signal R and a blue signal B by calculating the signal charges W, Y, Cy and G. If the arrangement of the color filters shown in FIG. 9B is used, the luminance signal Y can be directly obtained from the output of the AGC amp. 53, so that the delay circuit 55 is not necessary. The numerals 57, 58, 59, 60, 61, 62 and 63 denote an amplifier, a clamp circuit, a γ correction circuit, a blanking circuit, a delay circuit, and a white clip circuit, respectively. The numerals 64 and 66 designate a color signal processor and a synchronous signal generator, respectively. The color signal processor 64 will be explained in FIG. 16 in more detail. A NTSC video signal is produced by adders 65 and 67, amplified by an output amplifier 68 and supplied to an output terminal 69. All of the elements 53 to 68 are commercially available units and/or can be designed according to well-known principles for the purposes discussed. A detector 72 for detecting a scene illumination produces control signals for an iris controller 73 and a BG pulse controller 75. The numeral 74 indicates a BG pulse generator.

Figure 11:
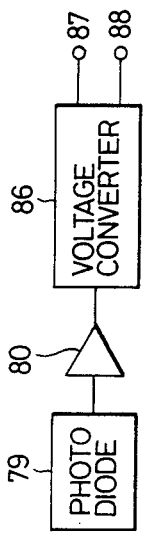
FIG. 11 is a block diagram of the detector 72 for a scene illumination level shown in FIG. 10.

In this embodiment, the iris control and the BG pulse control are of a forward type (i.e., a type of AGC wherein the AGC is generally executed by controlling a bias current of a transistor). This type controller is easy to understand in correspondence to the curves shown in FIG. 7. An embodiment of the detector 72 is shown in FIG. 11. The numeral 79 denotes a photoelectric converter, for example, a photodiode, a photoconductor or other equivalent device, which is attached the camera outside the barrel 51, or inside the barrel 51 and outside the iris. The numerals 80 and 86 designate an amplifier and voltage converter, respectively. The voltage converter 86 supplies appropriate voltages dependent to the curves shown in FIG. 7 to a voltage terminal 87 for the iris controller 73 and a voltage terminal 88 for the BG pulse controller 75.

Figure 12:
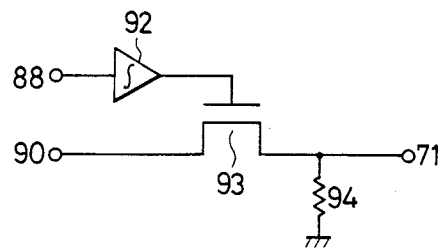
FIG. 12 is a circuit diagram of the control circuit 75 of BG pulses shown in FIG. 10.
Figure 13:
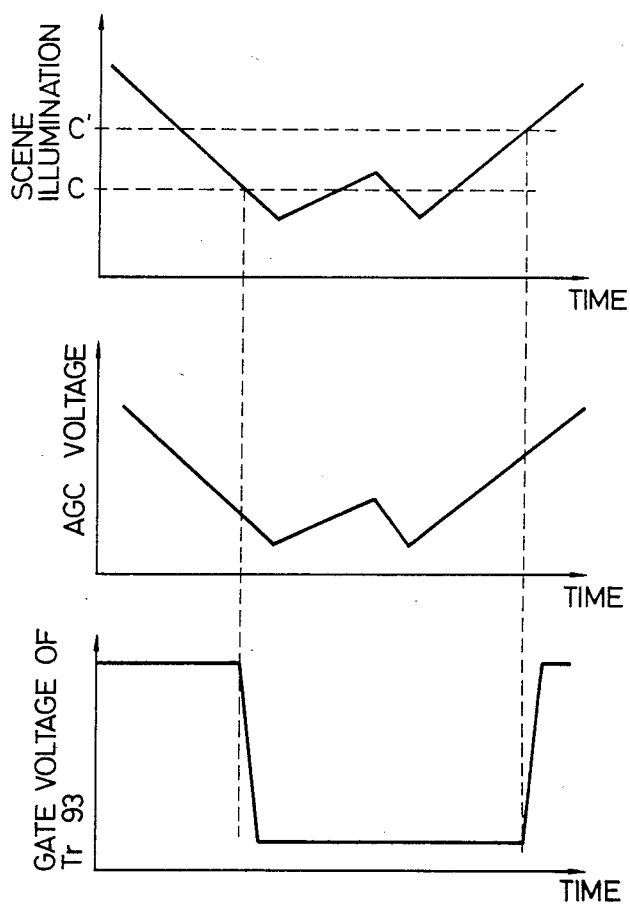
FIG. 13 represents a characteristic of an AGC voltage and a gate voltage of the MOS transistor 93 for explaining a hysteresis control.

An embodiment of the BG pulse controller 75 is shown in FIG. 12. The numeral 90 denotes a BG pulse output terminal of the BG pulse generator 74, which is connected to the BG pulse input terminal 71 of the sensor 52 through a n-channel MOS transistor 93. A terminal 71 is connected to a ground through a resistor 94. When a low level voltage is supplied to a gate of the MOS transistor 93 and the MOS transistor 93 takes the OFF state, the BG pulse input terminal 71 is connected to the ground. As the value of resistor 94 is set sufficiently larger than an on-impedance of the transistor 93 and an output impedance of the BG pulse generator 74, the output of the BG pulse generator 74 is supplied to the BG pulse input terminal 71 of the sensor 52 in the ON state of the transistor 93. The AGC voltage from an input terminal 88 is supplied to the gate of the transistor 93 through a Schmitt trigger amplifier 92, which is set in order to give hysteresis on the sweep out mentioned above. FIG. 13 shows an example of the hysteresis control for the sweep out. As the hysteresis control is apparent from FIG. 13, a detailed explanation is omitted. Anyway, in this embodiment, when the scene illumination becomes lower than a constant value C (e.g., 20 to 30 lux), the sweep out is stopped in order to reduce the noise, and as the scene illumination becomes higher than a constant value C', the sweep out is executed in order to reduce the vertical smear.

Figures 14, 15:
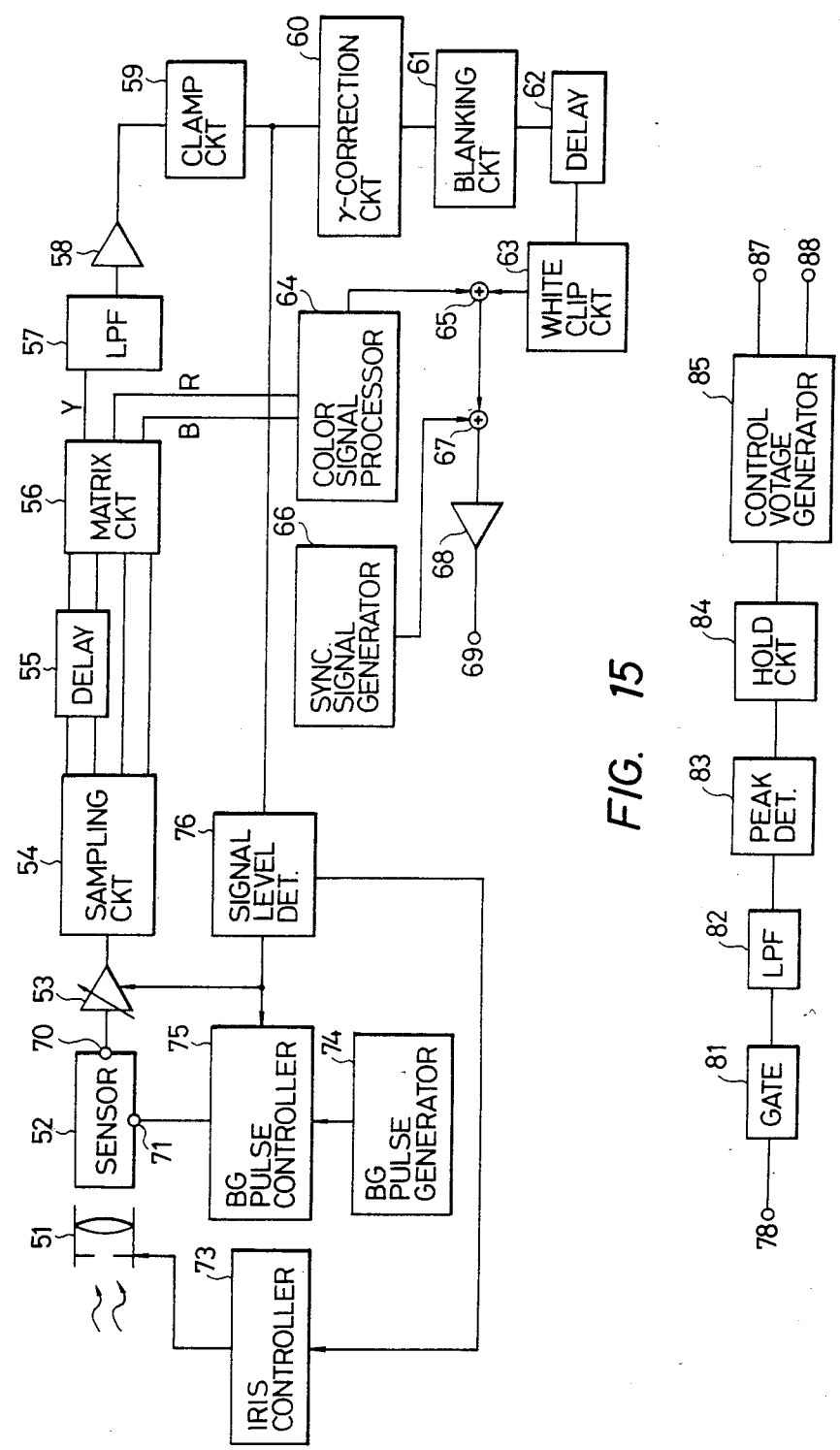
FIG. 14 is a block diagram representation of a CPD type solid state camera according to another embodiment of this invention.
FIG. 15 represents a block diagram of an embodiment of the signal level detector 76 shown in FIG. 14.

FIG. 14 represents another embodiment of the present invention. In comparison with the embodiment shown in FIG. 11, it has a difference that the iris control and the BG pulse control are feedback type. Namely, the iris and the AGC are controlled in order to make an average level of the output of the clamp circuit 59, the γ correction circuit 60, or the blanking circuit into a fixed value. The numeral 76 denotes a signal level detector, in which a luminance signal level (for example, the S/N level of the luminance signal) of the central part 181 shown with the oblique lines in FIG. 8 is detected. In general, the signal level is a value between an average value and a peak value. If the signal level does not reach a predetermined level, output signals of the detector 76 are varied to make the iris more open, and in a case where the iris is fully open, to increase the gain of the AGC amplifier 53. If the signal level is higher than the predetermined level, the output signals thereof are varied to decrease the gain of the AGC amplifier 53, and in a case where the gain is the lowest, to close the iris more. An embodiment of the signal level detector 76 is shown in FIG. 15. In FIG. 15, the numerals 78, 81, 82, 83, 84 and 85 denote an input terminal, a gate, a low pass filter (hereinafter LPF), a peak detector, a hold circuit and a control voltage generator, respectively. The gate 81 passes only the signal of the central part 181 shown in FIG. 8. By selecting a pass band of the LPF 82, it is possible to make the signal level near the average value, or near the peak value. Namely, a wide pass band of the LPF 82 makes the signal level near the average value and by making the pass band narrow the signal level becomes near the peak value. It is possible to attach the function of the gate 81 to the hold circuit 84. The control voltage generator 85 compares the output with the fixed value, and varies the iris control voltage and the AGC voltage in response to the result of the comparison by using the same method as that mentioned above. In this embodiment, the control of the sweep out is the same as the embodiment shown in FIG. 10.

Figure 16:
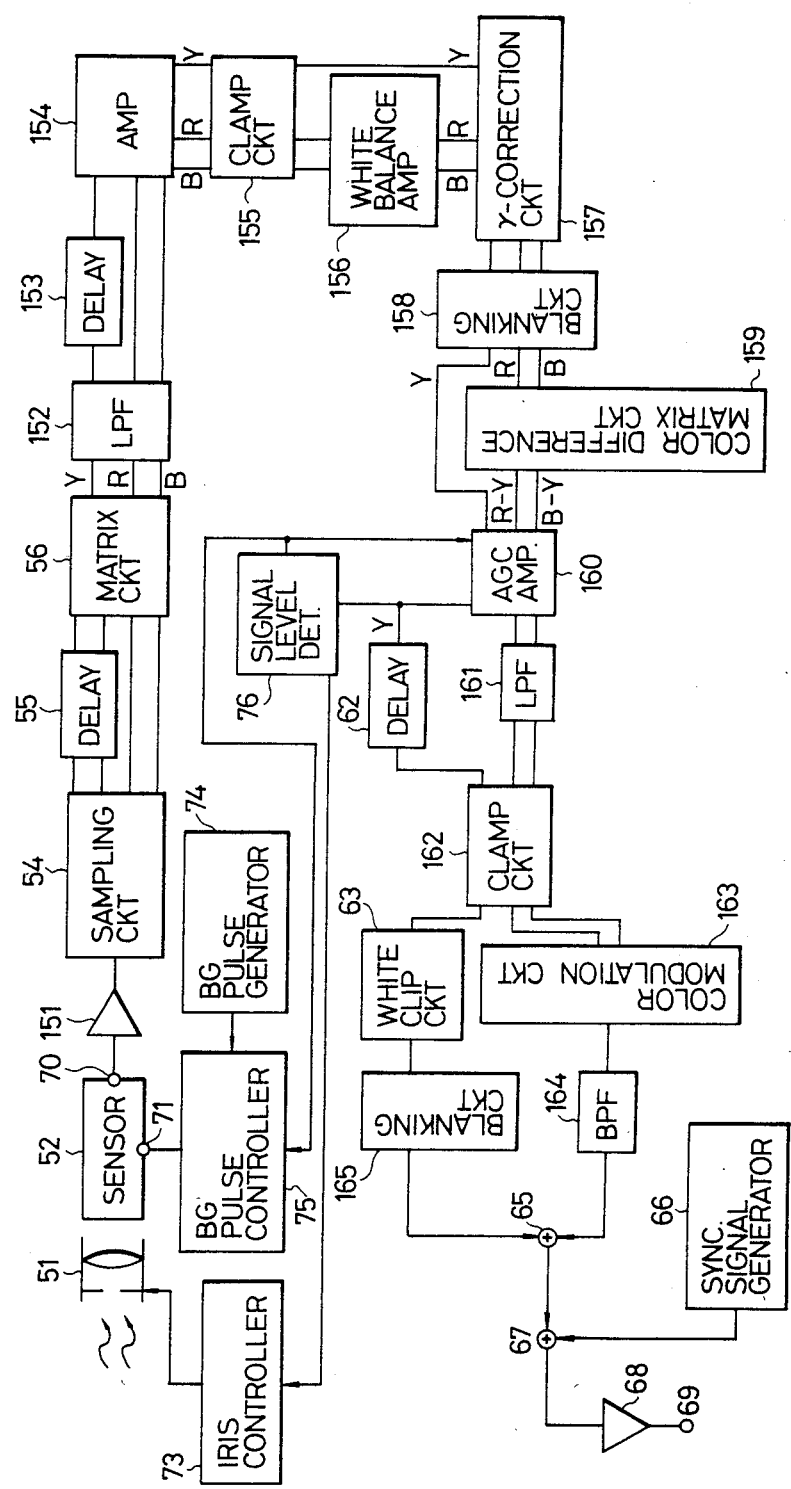
FIG. 16 is a block diagram representation of a CPD type solid state camera according to the third embodiment of this invention.

FIG. 16 shows another embodiment of this invention, in which an AGC amplifier is inserted in the latter part of the circuit. In this case, it is necessary to control a color difference signal by the AGC, so that the color signal processor is shown in detail. The numerals 151 and 152 denote an amplifier having a constant gain and a low pass filter (hereinafter, LPF), respectively. Usually the LPF 152 has different characteristic to the luminance signal from one to the color signals R and B. The numeral 153 designates a delay circuit to compensate for this. However, this delay circuit is not necessary if the characteristic of the LPF 152 to the luminance signal is the same for both the color signals R and B. The numerals 154, 155, 156, 157, 158, 159, 160, 161 and 162 denote an amplifier, a clamp circuit, a white balance amplifier, a $\gamma$ correction circuit, a blanking circuit, a color difference matrix circuit and an AGC amplifier, respectively. The clamp circuit is not necessary in the case that a direct current is held from the clamp circuit 155 to the clamp circuit 162. The color modulator 163 frequency-modulates a color sub-carrier by the color difference signal. The numerals 164 and 165 denote a band pass filter (hereinafter BPF) and a blanking circuit, respectively. In this embodiment, the system for controlling the sweep out, for example, the signal level detector 76 is the same as one shown in FIG. 14.

Figure 17:
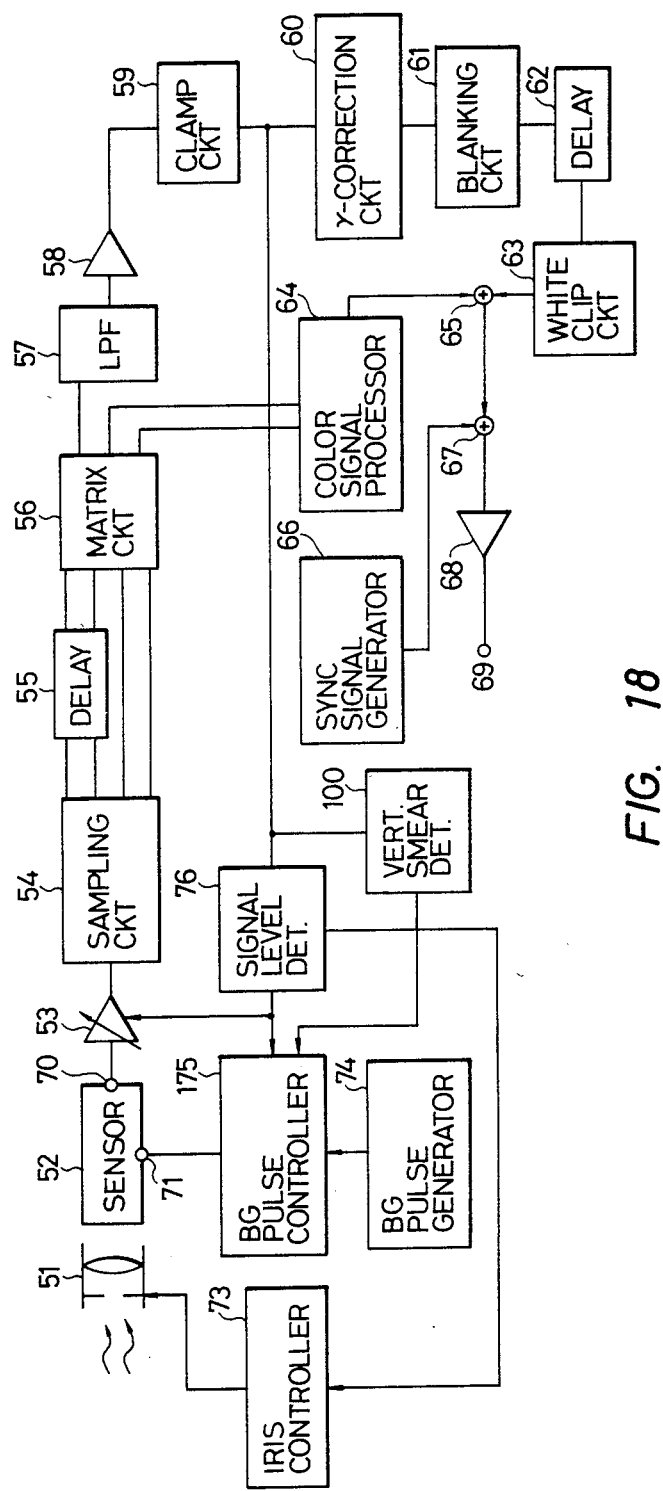
FIG. 17 is a block diagram of a CPD type solid state camera according to the fourth embodiment of this invention.
Figure 18:
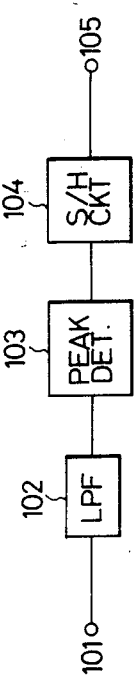
FIG. 18 represents a block diagram of an embodiment of the detector 100 shown in FIG. 17.
Figure 19:
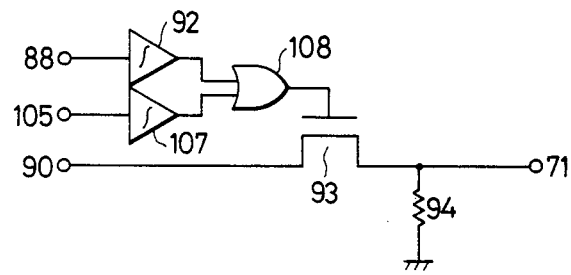
FIG. 19 represents a circuit diagram of an embodiment of the BG pulse controller 175 shown in FIG. 17.

FIG. 17 represents the fourth embodiment of this invention, which contains a control circuit for allowing control based on the level of the vertical smear. Referring to FIG. 17, the numeral 100 denotes a detector for the vertical smear, which is shown in detail in FIG. 18. The numerals 101, 102, 103, 104 and 105 designate an input terminal, a low pass filter (LPF), a peak detector, a sample hold circuit and an output terminal of a vertical smear level, respectively. A BG pulse controller 175 controls the sweep out by using the AGC voltage and the vertical mear level. FIG. 19 shows an embodiment of the BG pulse controller 175. The numerals 105, 107 and 108 denote a vertical smear level terminal, a Schmitt trigger amplifier and an OR circuit, respectively. As is apparent from FIG. 19, the sweep out is stopped on condition that the gain of the AGC is larger than the fixed value, that is, the scene illumination is lower than another fixed value, and the vertical smear level is lower than an appropriate level.

Figure 20:
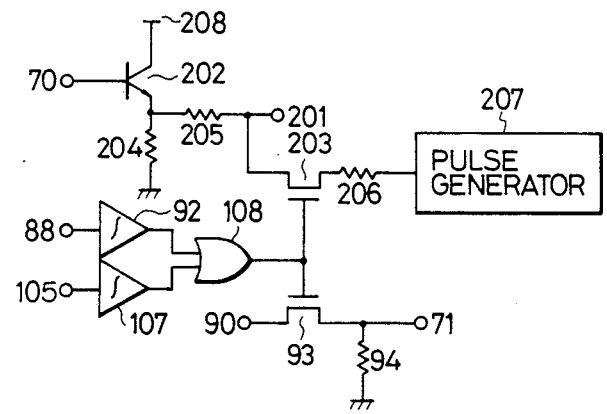
FIG. 20 represents a circuit diagram for varying a set up of a block level according to an embodiment of this invention.

FIG. 20 shows a circuit diagram of an embodiment for varying a set up of a black level in response to the control of the sweep out. This embodiment is applied to the circuit shown in FIG. 17 and is coupled to receive the output of the gate 108 of the PG pulse generator of FIG. 19, as shown. Referring to FIG. 20, an emitter follower amplifier is inserted between the output terminal 70 of the sensor 52 and an input terminal 201 (which is coupled to the input of AGC amplifier 53 in FIG. 17), so that the set up of the black level is varied. In practice, it has been found that there is a small difference in the black level between the case of executing the sweep out and the case of stopping the sweep out. Therefore, the arrangement of FIG. 20 permits correcting this. The numeral 202 denotes a bipolar transistor and the numeral 203 denotes a n-channel MOS transistor. The numerals 204, 205 and 206 denote resistances. The numerals 207 and 208 designate a pulse generator and a power line, respectively. The pulse generator 207 generates a pulse corresponding to a picture element of an optical black. By using this pulse, the optical black level in the case of executing the sweep out is varied. As a result, the set up of the black level will be the same regardless of whethersweep out occurs or not.

Figure 21:
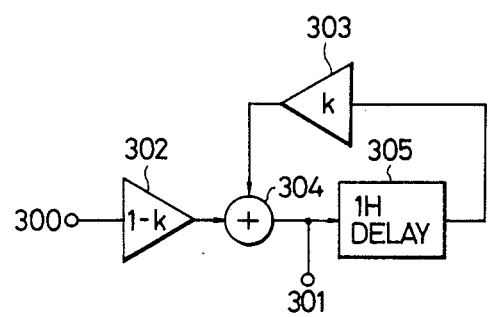
FIG. 21 represents a circuit diagram for a comb filter used by this invention.

Next, an embodiment of a comb filter will be explained. FIG. 21 shows a general comb filter having a gain 1 which can be inserted between the color signal processor 64 and the adder 65 shown in FIG. 10. The numerals 300, 301, 302, 303, 304 and 305 designate an input terminal, an output terminal, an amplifier having a gain $(1-k)$, an amplifier having a gain k, an adder, and a 1H delay circuit. k is a feedback ratio and $0 \leq k < 1$. This comb filter has a characteristic A(f) of frequency vs. amplitude as shown in the following formula.

$$A(f) = (1 - k)/\sqrt{1 - 2k \cos 2\pi fh + k^2} . \qquad (4)$$

As mentioned before, it is possible to reduce the random noise by using the comb filter. If the noise is a flat noise, the power thereof becomes $(1-k)/(1+k)$ multiple and the noise goes down 4.8 dB at k=0.5. Concerning to the random noise represented by the formula (3), the power thereof becomes $(1-k)^2/(1+k)$ multiple and the random noise goes down 7.8 dB at k=0.5. It is apparent that the method of suppressing the random noise by using the comb filter is more effective. Therefore, using the comb filter shown in FIG. 21 in co-operation with stopping the sweep out improves the sensitivity remarkably. Further, it is possible to improve the effect of raising up the sensitivity without the sweep up by increasing the feedback ratio k of the comb filter in response to increase of the gain of the AGC amplifier.

Figure 22:
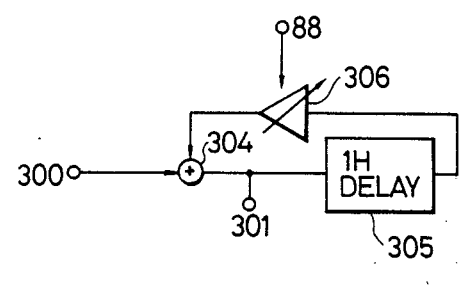
FIG. 22 represents a circuit diagram for another comb filter used by this invention.

FIG. 22 shows an embodiment of increasing the feedback ratio k together with the gain of the AGC amplifier. The numeral 306 denotes an AGC amplifier, in which it is possible to vary the gain. In consideration of a signal pass band, it is desirable that the AGC amplifier having a comb filter characteristic is applied to an AGC amplifier which is set in the latter part as shown in FIG. 16. Specifically, three circuits corresponding to FIG. 22 can be used to replace the AGC amplifier 160 of FIG. 16. In this case, all of the terminals 88 of the three circuits will be coupled to the output terminal of the signal level detector 76. The respective input terminals 300 of the three circuits will be arranged so that one is coupled to the output terminal of the blanking circuit 158 and the other two are coupled to respective outputs of the color difference matrix circuit 159. The output terminals 301 of the three circuits are respectively coupled to the input terminal of the signal level detector 76 and the input terminals of the low pass filter 161.

As mentioned above, the CPD type solid state camera of the present invention can have the effect of suppressing the vertical smear by executing the sweep out on condition that the vertical smear is remarkable, and can suppress the random noise generated in the combination part more than 3 dB, eliminate completely the FPN and the shading generated in the combination part and obtain the effect of raising up the sensitivity extremely by stopping the sweep out on condition that the scene illumination becomes dark.

We claim:

1. A method for driving a solid state camera which comprises a group of photoelectric converting elements arranged in a two dimensional array, a group of vertical switches, each of which is connected to a corresponding photoelectric converting element, a plurality of vertical signal lines, each of which is connected to a plurality of the photoelectric converting elements through the vertical switches, a charge transfer device including means for transferring signal charges from said photoelectric converting elements in a horizontal direction, coupling means for coupling the vertical signal lines with the charge transfer device, and means for sweeping out undesired excess charges from the vertical signal lines prior to transfer of the signal charges from the photoelectric converting elements to the vertical signal lines, the method comprising the steps of:

detecting a scene illumination level for a scene being viewed by the solid state camera;

comparing the scene illumination level with a predetermined value; and stopping the sweep out of the undesired excess charges when the scene illumination level is lower than the predetermined value.

2. A method according to claim 1, further comprising the steps of:

detecting a quantity of a vertical smear;

comparing the quantity of the vertical smear with a fixed value; and stopping the sweep out thereof only when both the scene illumination level is lower than the predetermined value and the quantity of the vertical smear is smaller than the fixed value.

3. An apparatus for driving a solid state camera which comprises a group of photoelectric converting elements arranged in a two dimensional array, a group of vertical switches, each of which is connected to a corresponding photoelectric converting element, a plurality of vertical signal lines, each of which is connected to a plurality of the photoelectric converting elements through the vertical switches, a charge transfer device including means for transferring signal charges from said photoelectric converting elements in a horizontal direction, coupling means for coupling the vertical signal lines with the charge transfer device, and means for sweeping out undesired charges from the vertical signal lines prior to read-out of the signal charges from the photoelectric converting elements into the vertical signal lines, the apparatus comprising:

means for detecting a scene illumination level in a scene being viewed by said solid state camera;

first comparing means for comparing the scene illumination with a predetermined value; and means for controlling the sweeping out means in response to at least an output of said first comparing means, wherein said controlling means stops the sweep out means when the scene illumination level is lower than the predetermined value.

4. An apparatus according to claim 3, further comprising:

means for detecting a quantity of a vertical smear;

second comparing means for comparing the quantity of the vertical smear with a fixed value; and means for supplying an output of said second comparing means to said controlling means, wherein said controlling means stops the sweep out means only when both the scene illumination level is lower than the predetermined value and the quantity of the vertical smear is smaller than the fixed value.

5. An apparatus according to claim 3, further comprising:

means for varying a pass band in a vertical direction of a luminance signal output of said solid state camera in response to the control of the sweep out, wherein said varying means operates to narrow the pass band in the vertical direction of the luminance signal when the sweep out means is stopped.

6. An apparatus according to claim 5, wherein said varying means is a comb filter.

7. An apparatus according to claim 3, wherein said controlling means has an hysteresis on the control for executing and stopping the sweep out means.

8. An apparatus according to claim 4, further comprising:

means for varying a pass band in a vertical direction of a luminance signal output of said solid state camera in response to the control of the sweep out, wherein said varying means operates to narrow the pass band in the vertical direction of the luminance signal when the sweep out means is stopped.

9. An apparatus according to claim 4, wherein said controlling means has an hysteresis on the control for executing and stopping the sweep out means.

10. A method according to claim 1, wherein said predetermined scene illumination level is between 20 and 30 lux.

11. Amethod according to claim 2, wherein said predetermined scene illumination level is between 20 and 30 lux and said fixed value of vertical smear is 20 na.

12. An apparatus according to claim 3, wherein said predetermined scene illumination level is between 20 and 30 lux.

13. An apparatus according to claim 3, wherein said predetermined scene illumination level is between 20 and 30 lux and said fixed value of vertical smear is 20 na.

* * * * *